(12) United States Patent
Chan

(10) Patent No.: US 9,377,670 B2
(45) Date of Patent: Jun. 28, 2016

(54) LENS MODULE HAVING A POSITIONING STRUCTURE

(71) Applicant: TDK Taiwan Corp., Nangang Dist., Taipei (TW)

(72) Inventor: Yi Liang Chan, Taoyuan County (TW)

(73) Assignee: TDK Taiwan, Corp. (TW)

( * ) Notice: Subject to any disclaimer, the term of this patent is extended or adjusted under 35 U.S.C. 154(b) by 0 days.

(21) Appl. No.: 14/637,012

(22) Filed: Mar. 3, 2015

(65) Prior Publication Data
US 2015/0264240 A1  Sep. 17, 2015

(51) Int. Cl.
*G06K 7/10* (2006.01)
*G03B 13/34* (2006.01)
*G02B 7/10* (2006.01)
*G02B 13/00* (2006.01)
*H04N 5/225* (2006.01)

(52) U.S. Cl.
CPC ............ *G03B 13/34* (2013.01); *G02B 7/102* (2013.01); *G02B 13/009* (2013.01); *H04N 5/2257* (2013.01)

(58) Field of Classification Search
CPC .......... G06K 7/10732; G06K 7/10722; G06K 7/10811; G06K 7/10594
USPC ............................................. 235/454
See application file for complete search history.

(56) References Cited

U.S. PATENT DOCUMENTS

| 4,505,537 A | * | 3/1985 | Funato | G02B 26/106 |
| | | | | 235/454 |
| 5,859,715 A | * | 1/1999 | Meyers | G02B 26/106 |
| | | | | 359/17 |

* cited by examiner

*Primary Examiner* — Jamara Franklin

(57) ABSTRACT

A lens module, defined with an X-axis, a Y-axis and a Z-axis perpendicular to each other, includes an image sensor module, an optical lens module and a compensation module. The image sensor module is located on an X-Y plane. The optical lens module, located corresponding to the image sensor module, has an image capturing axis extending along the Z-axis. The compensation module, located between the image sensor module and the optical lens module for compensating a deviation position and a tilt angle of the optical lens module, includes a bulged cambered surface and a concaved cambered surface corresponding to the bulged cambered surface. The bulged cambered surface is synchronously movable with the image capturing axis of the optical lens module and can slide relative to the concaved cambered surface, so as to compensate the tilt between the image capturing axis and the image sensor module.

10 Claims, 8 Drawing Sheets

LENS MODULE HAVING A POSITIONING STRUCTURE

This application claims the benefit of Taiwan Patent Application Serial No. 103109003. filed Mar. 13, 2014, the subject matter of which is incorporated herein by reference.

BACKGROUND OF INVENTION

1. Field of the Invention

The invention relates to a lens module having a positioning structure, and more particularly to the lens module that applies a compensation module to reduce a Z-axis tilt to an allowable extent so as to ensue the image-capturing quality, in which the Z-axis tilt is generated from improper engagement between the optical lens module and the image sensor module.

2. Description of the Prior Art

Referring to FIG. 1, an exploded view of a conventional focusing 0r zooming lens set is shown, in which a mechanical focusing mechanism 7 is used. The mechanical focusing drive unit 7 applies an expensive precision drive unit 71 to drive the carrier 73 carrying the lens set 72, in which the precision drive unit 71 is one of a step motor, a supersonic motor, a piezoelectric actuator and the like. For the drive unit 71 is consisted of plenty transmission members, the mechanism thereof is complicated, needs much work to assembly, occupies a larger room, costs higher, and consumes more electricity. All of these reasons contribute to the high and hard-to-be-reduced price of the lens set.

In the art, the photographing is cumbersome in human light-detecting, hand focusing or zooming, hand reeling, and the like. The consequence of involving too much human work or too many human reasons in photographing is an inevitable mistake somewhere and sometime. Obviously, it is kind of tragedy to have mistakes in scene taking, for the timing thereof is once and no more. Namely, in the art, the quality of the photographing is highly dependent of the training of the photographers. As the development in mechanical automations during 50's and 60's, the auto light-detector and the auto film-reeler are firstly seen in the photographing techniques. Such an improvement initiates a complete automation in the field of photographing. Among all the changes, a key and the most popular technique for the photography automation is the auto-focusing system, which ensures the photo-taking rate.

It is now already the trend to replace the conventional professional photographing gears by the modern photographing set featured in better resolutions, lighter weight, slimmer and shorter body. However, even all the progresses and advantages in automation, the mechanical motor such as the step motor is still applied but causes problems in irreducible body occupation and thus in further minimizing the product.

On the other hand, another progress in the photography technology is the invention of the voice coil motor (VCM), which adapts modern electromagnetic technique to load a feedback control system for monitoring the deviation of the coil assembly and so as able to replace the step motor and to further reduce the poor precision problems caused by mechanical backlashes and production tolerances. In addition, another trend in the photography technology is to integrate various fancy functions into a unique product, such as the mobile phone with both photographing and communication functions, the PDA with built-in camera, and the notebook computer capable of videotaping.

Nevertheless, for most of the lens modules in the marketplace, the optical lens module is mounted along a Z-axis on an image sensor module located on an X-Y plane, such that the image sensor module can apply the optical lens module to capture foreign images. Also, most of the lens modules do not build in an anti-tilt mechanism, in which the tilt is particularly the Z-axis tilt between the image capturing axis of the optical lens module and the image capturing path of the image sensor module. Namely, the existing manufacturing Z-axis tilt upon the lens module can be resolved. In assembling the lens module, possible smoothness problems on the contact surfaces may lead to the tilt of the image capturing axis with respect to the image capturing path of the image sensor module. Further, such a tilt would affect negatively the linearity, repeatability, straightness, and perpendicularity of the lens set with respect to the optical axis. Apparently, the manufacturing tilt in the image capturing axis would have lost control of each of the lens modules in Z-axis tilt after the production. As a consequence, the overall imaging quality of the lens module as well as the position precision for the displaceable lens set would be reduced to some extent.

SUMMARY OF THE INVENTION

Accordingly, it is the primary object of the present invention to provide a lens module having a positioning structure, in which a compensation module is applied to limit the Z-axis tilt of the optical lens module into an allowable range so as to ensure the image capturing, which the Z-axis tilt is generated while the optical lens module is engaged to the image sensor module.

In the present invention, the lens module having a positioning structure, defined with an X-Y-Z coordinate system, includes an image sensor module, an optical lens module and a compensation module. The image sensor module located on an X-Y plane has an image capturing path extending along the Z-axis. The optical lens module having an image capturing axis also extending along the Z-axis is located in correspondence with the image sensor module. The compensation module located between the image sensor module and the optical lens module for compensating the tilt angle of the optical lens module about the Z-axis includes a bulged cambered surface and a concaved cambered surface located respectively to the bulged cambered surface. The bulged cambered surface and the image capturing axis of the optical lens module are moved synchronously. By providing the sliding contact between the bulged cambered surface and the concaved cambered surface, the Z-axis tilt between the image capturing axis of the optical lens module and the image capturing path of the image sensor module can be adjusted to be within an allowable range.

All these objects are achieved by the lens module having a positioning structure described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a lens module having a positioning structure. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
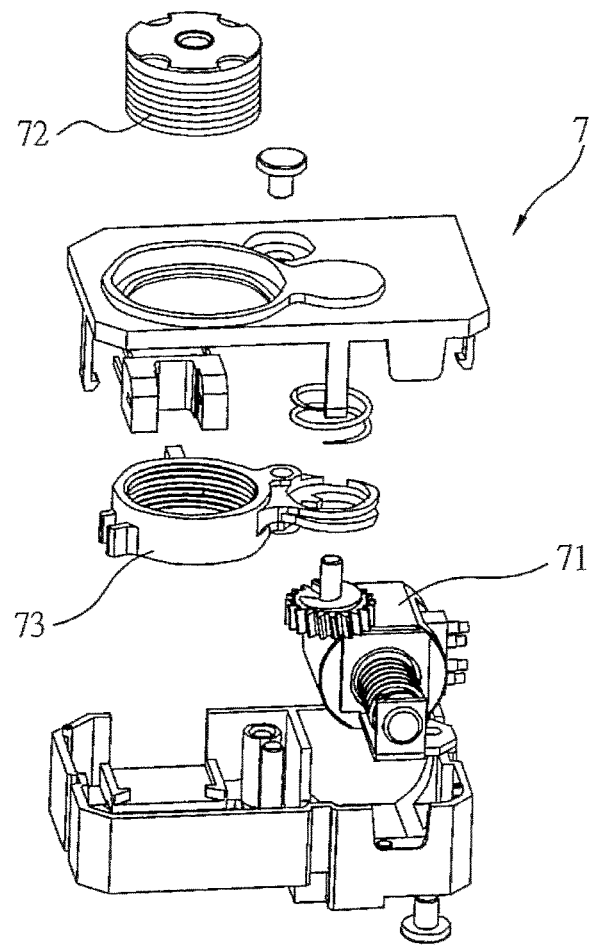
FIG. 1 is a schematically exploded view of a conventional focusing or zooming lens set.
Figure 2:
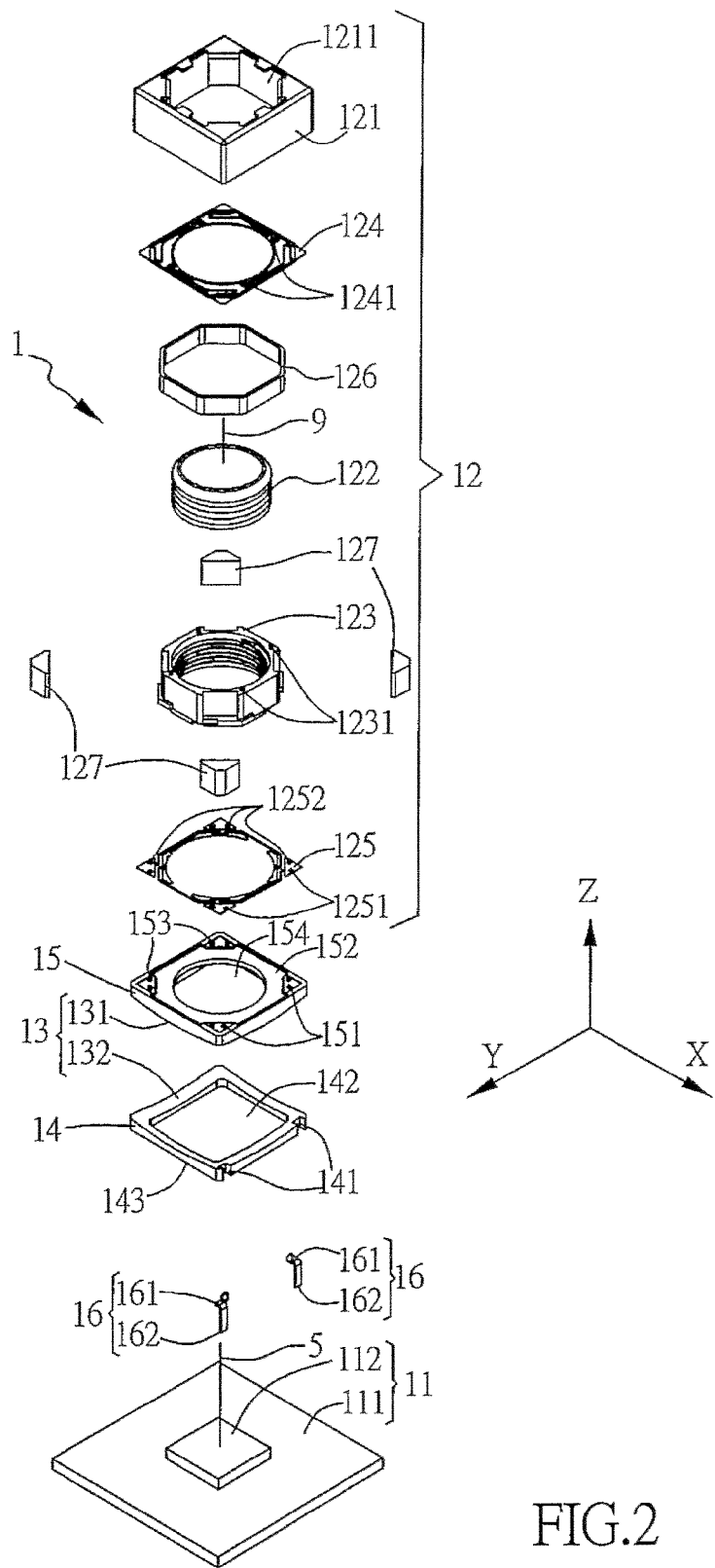
FIG. 2 is a schematically exploded view of a first embodiment of the lens module having a positioning structure in accordance with the present invention.
Figure 3:
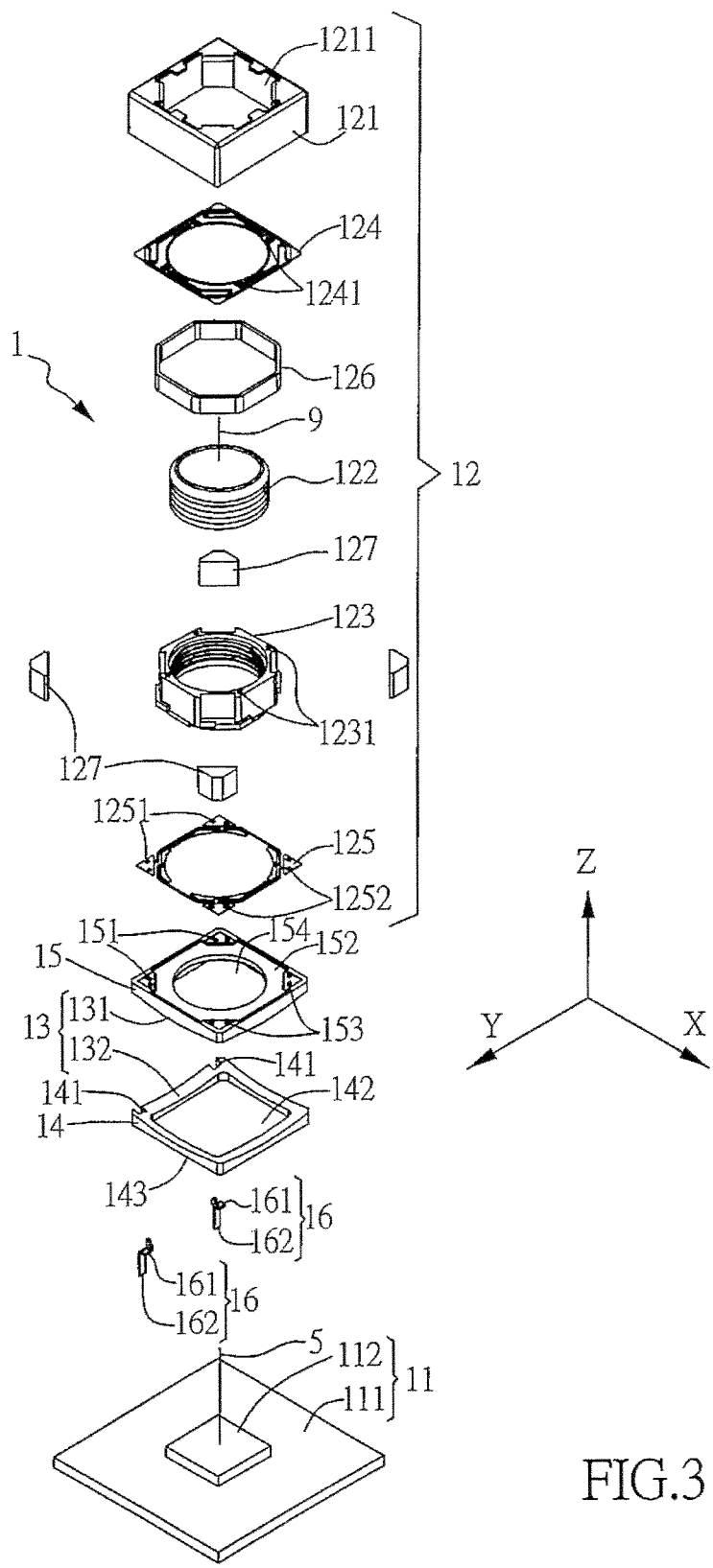
FIG. 3 is another view of FIG. 2.
Figure 4:
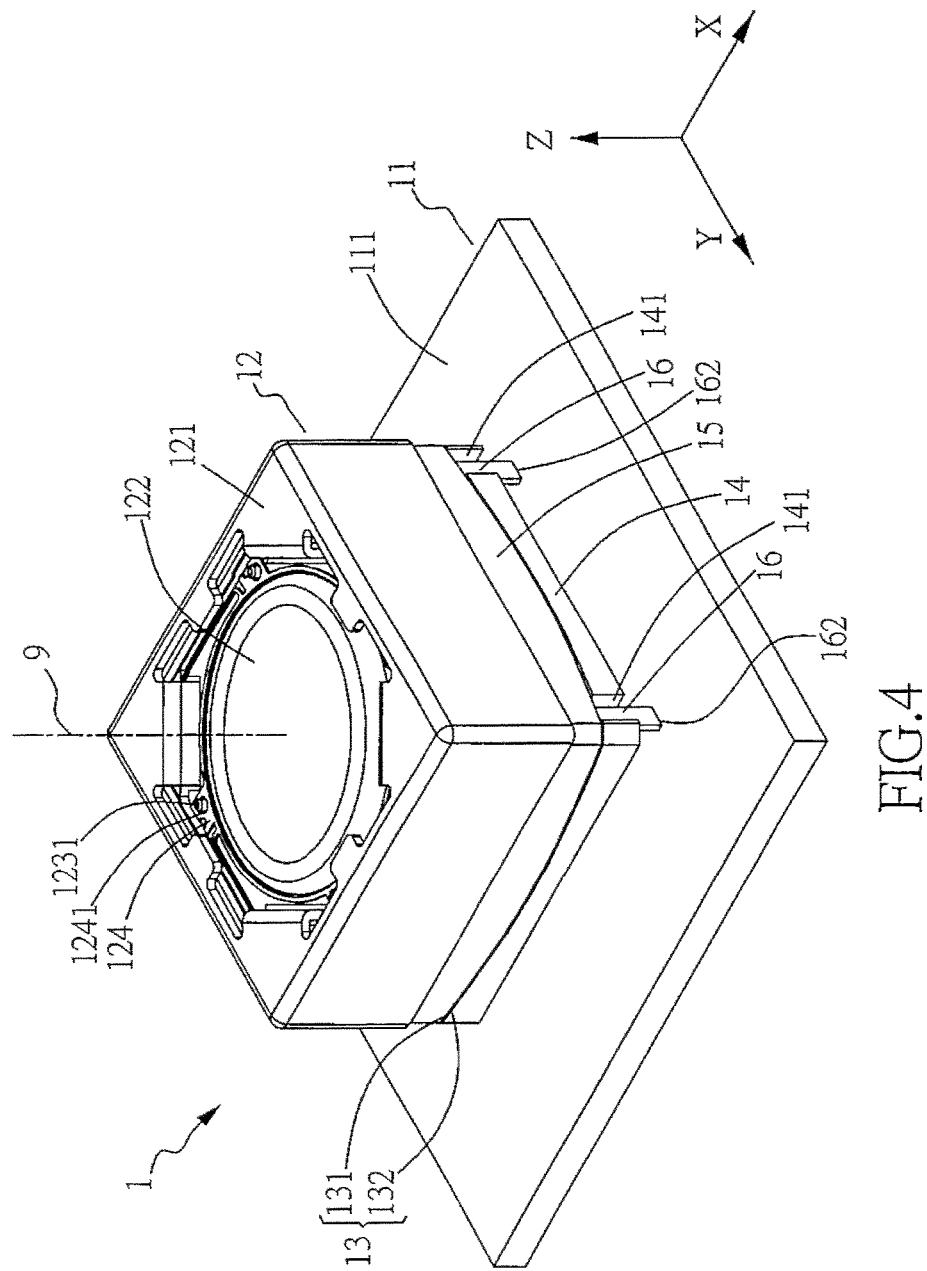
FIG. 4 shows an assembled state of FIG. 2.
Figure 5:
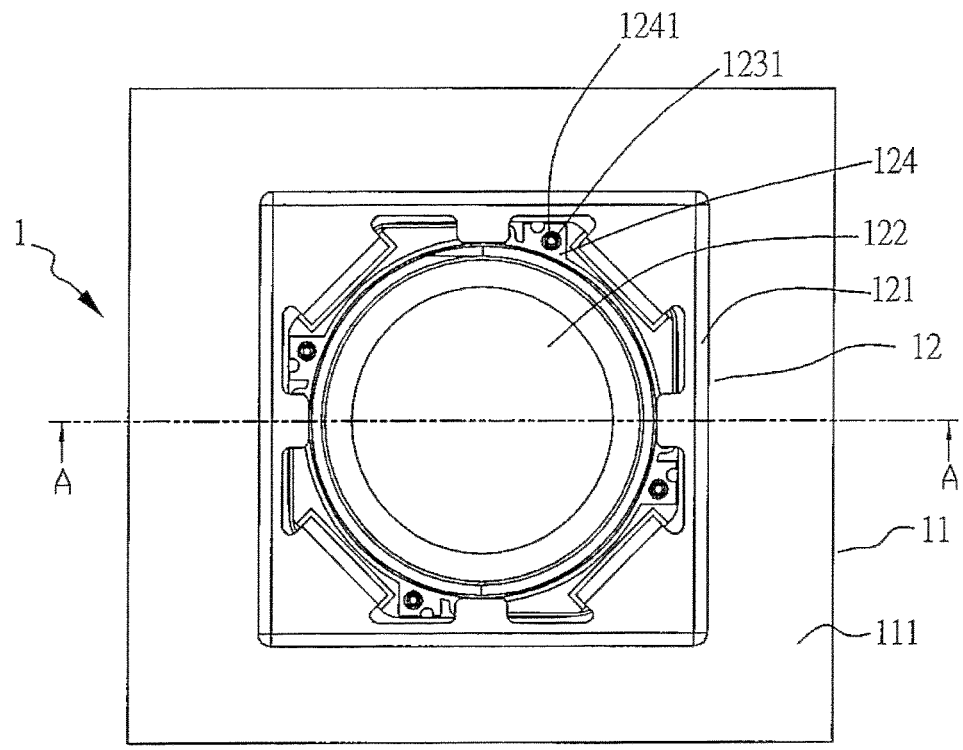
FIG. 5 is a top view of FIG. 4.
Figure 6A:
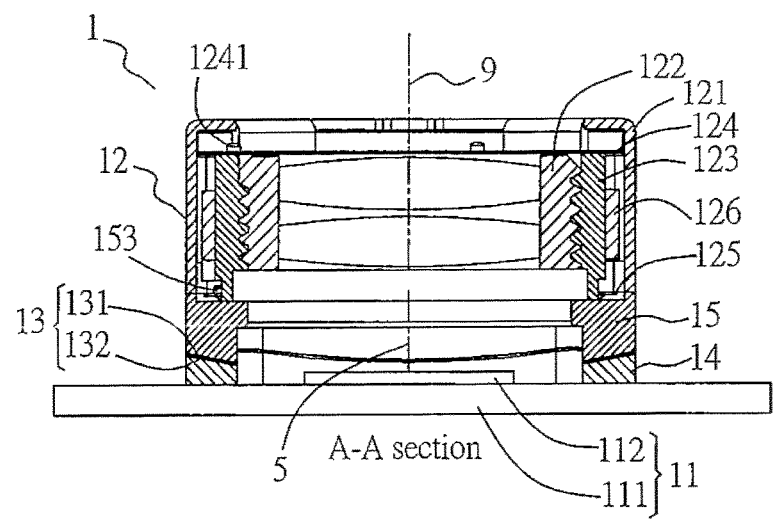
FIG. 6An is a cross sectional view of FIG. 5 along line A-A.
Figure 6B:
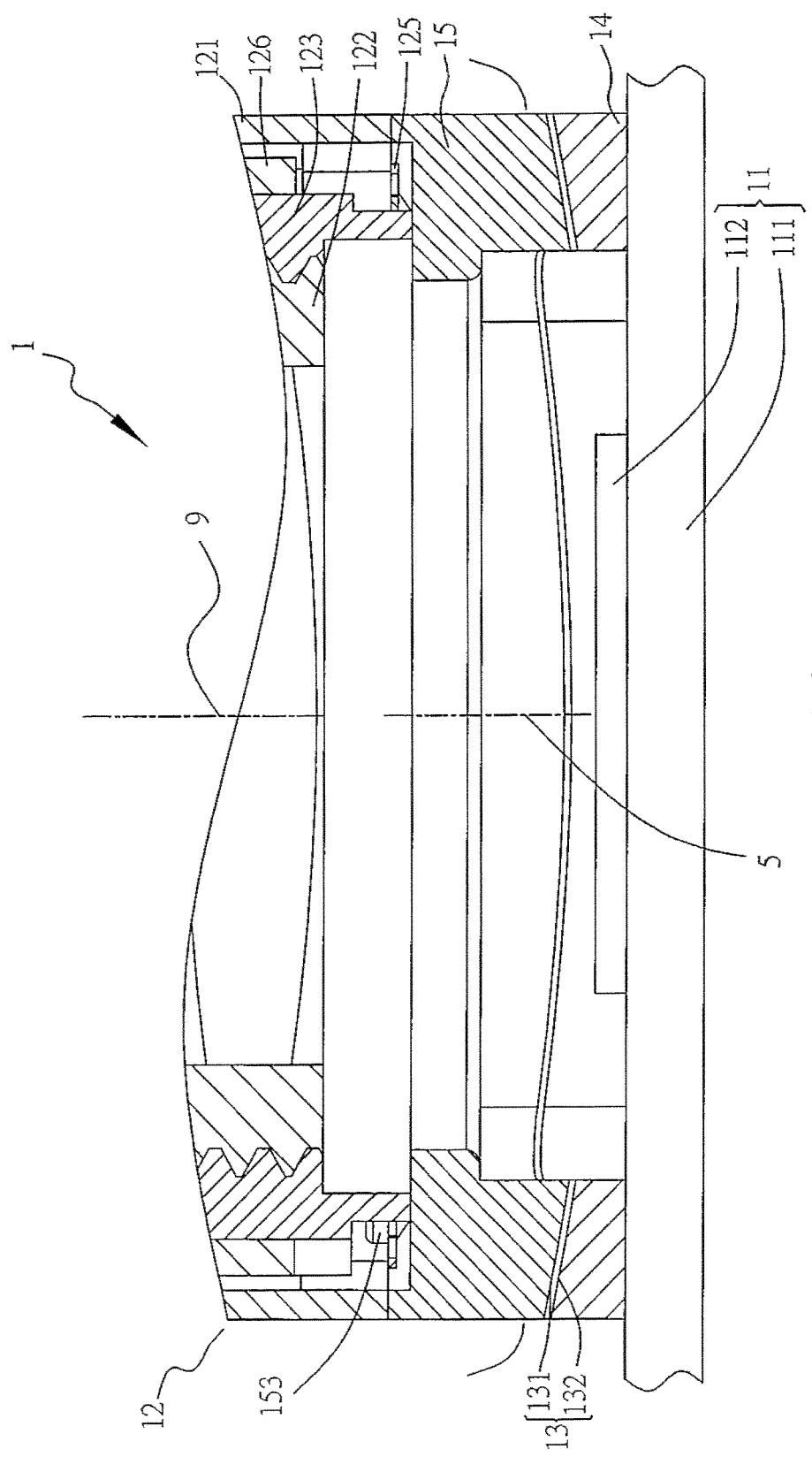
FIG. 6B is an enlarged view of a portion of FIG. 6A.

Refer now to FIG. 2, FIG. 3, FIG. 4, FIG. 5, FIG. 6A and FIG. 6B, in which FIG. 2 is a schematically exploded view of a first embodiment of the lens module having a positioning structure in accordance with the present invention, FIG. 3 is another view of FIG. 2, FIG. 4 shows an assembled state of FIG. 2, FIG. 5 is a top view of FIG. 4. FIG.6An is a cross sectional view of FIG. 5 along line A-A, and FIG. 6B is an enlarged view of a portion of FIG. 6A. As shown, the lens module having a positioning structure 1, defined with an X-Y-Z orthogonal coordinate system, includes an image sensor module 11, an optical lens module 12, a compensation module 13, a frame 14, a base 15 and at least one elastic position member 16.

In the first embodiment of the present invention, the image sensor module 11, located on an X-Y plane and having an image capturing path 5 extending along the Z-axis, further includes a circuit board 111 and an image sensor 112. The image sensor 112 located on the circuit board 111 is to capture the foreign optical images by the image sensor 112 and via the optical lens module 12. The image sensor 112 can be a one of the CCD sensor and the CMOS sensor.

In the first embodiment of the present invention, the optical lens module 12 has an image capturing axis 9 extending substantially along the Z-axis and positioned in correspondence with the image sensor module 11. Ideally, the image capturing axis 9 of the optical lens module 12 and the image capturing path 5 of the image sensor module 11 shall be coincided on the Z-axis. In addition, the optical lens module 12 can be one of a focusing lens module and a zooming lens module. The optical lens module 12 includes a casing 121, a lens set 122, a lens set carrier 123, an upper spring plate 124, a lower spring plate 125, a coil assembly 126 and at least one magnetic member 127.

The compensation module 13, located between the image sensor module 11 and the optical lens module 12 for compensating the Z-axial tilt angle of the optical lens module 12, includes a bulged cambered surface 131 and a concaved cambered surface 132 located respectively to the bulged cambered surface 131. One of the bulged cambered surface 131 and the concaved cambered surface 132 is moved synchronously with the image capturing axis 9 of the optical lens module 12.

In the first embodiment of the present invention, the frame 14 having a hollow-out portion 142 provides a bottom surface 143 thereof to be fixed onto the circuit board 111 at a position above the image sensor 112. The base 15, having a central hole 154 to allow the optical lens module 12 to project the captured image onto the image sensor module 11 via the central hole 154 and through the hollow-out portion 142 of the frame 14, provides an engagement surface 152 to be fixed and located under the optical lens module 12 but to contact the frame 14.

Namely, in the first embodiment of the present invention, the optical lens module 12 is located above the frame 14 on the image sensor module 11 by sandwiching the base 15. The bulged cambered surface 131 of the compensation module 13 is located at a lateral side of the base 15 in correspondence with the engagement surface 152, while the concaved cambered surface 132 is located at a lateral side of the frame 14 in correspondence with the bottom surface 143. The concaved cambered surface 132 is to contact with the bulged cambered surface 131. Alternatively, in another embodiment of this present invention, the concaved cambered surface 132 of the compensation module 13 can be located at a lateral side of the base 15 in correspondence with the engagement surface 152, while the bulged cambered surface 131 is located at a lateral side of the frame 14 in correspondence with the bottom surface 143.

For the base 15 fixed under the lens set carrier 123 is further to restrain the lens set 122, the lens set carrier 123, the upper spring plate 124, the lower spring plate 125, the coil assembly 126 and the magnetic member 127 inside the casing 121, the bulged cambered surface 131 under the base 15 can move synchronously with the image capturing axis 9 of the optical lens module 12. By applying the sliding contact of the bulged cambered surface 131 on the concaved cambered surface 132 of the frame 14, the Z-axis tilt of the image capturing axis 9 of the optical lens module 12 about the image capturing path 5 of the image sensor module 11 can be adjusted to be reducibly within an allowable range.

Further, in the accommodation room 1211 of the casing 121 formed as a hollow sleeve-shape housing, the magnetic members 127 and the corresponding coil assembly 126 are located to the casing 121 and the lens set carrier 123, respectively. In the first embodiment of the lens module having a positioning structure 1 in accordance with the present invention, the magnetic members 127 are embodied as four sets of magnets located respectively to four corresponding corners inside the casing 121, in a manner of being respective to the coil assembly 126 located outside the lens set carrier 123. By energizing the coil assembly 126 fixed to the lens set carrier 123, corresponding magnetic forcing can be induced on the magnetic members 127 so as to drive the lens set carrier 123 to displace along the Z-axis inside the accommodation room 1211 and thus to perform focusing or zooming.

As shown, the lens set 122 is screwed into the lens set carrier 123, and the lens set carrier 123 is elastically clamped between the upper spring plate 124 and the lower spring plate 125 inside the accommodation room 1211 of the casing 121. In particular, a plurality of position holes 1241 constructed circularly on the inner ring of the upper spring plate 124 are there to be plugged respectively by the corresponding position protrusions 1231 formed on a top surface of the lens set carrier 123, while the outer ring of the upper spring plate 124 is fixed to the casing 121 in the accommodation room 1211. Upon such an arrangement, the lens set carrier 123 can be elastically held inside the accommodation room 1211 by the upper spring plate 124 and the lower spring plate 125. In the present invention, either of the upper spring plate 124 and the lower spring plate 125 can be made of a metal material and formed as an elastic hollow thin plate structure, and can be manufactured by a punch or stamping process.

In the first embodiment of the present invention, two sets of the elastic position members 16 are located at the same lateral side of the frame 14. Each of the elastic position members 16 includes a hook end 161 to penetrate the respective groove 141 of the frame 14, further to penetrate also the respective penetration hole 151 of the base 15, and then to fix the lower spring plate 125 onto the base 15 by hooking at the respective engagement portion 1251 on the lower spring plate 125. Namely, a plurality of the position protrusions 153 are constructed on the engagement surface 152 of the base 15 so as to match tightly the same number of the position holes 1252 located correspondingly at the lower spring plate 125. Thus, the engagement surface 152 of the base 15 to engage the optical lens module 12 can buckle up elastically the lower spring plate 125 via the elastic position members 16. In the first embodiment of the present invention, the elastic position member 16 can be made of a metal. A conductive end 162 of the elastic position member 16 opposing to the hook end 161 can establish an electric connection with the circuit board 111, such that a current of the circuit board 111 can be forwarded to energize the coil assembly 126 via the lower spring plate 125. The energized coil assembly 126 then can induce a magnetic field therein so as to exert a corresponding magnetic force on each of the magnetic members 122, and thereby the lens set carrier 123 can be driven to displace inside the accommodation room 1211 of the casing 121 in the Z-axial direction.

As shown in FIG. 6A and FIG. 6B, it is practically inevitable that a not-ideal or uneven contact surface exists between the optical lens module 12 and the image sensor module 11, and from which a tilt would be somehow formed between the image capturing axis 9 and the image capturing path 5 (which is the so called Z-axis tilt between the image capturing axis 9 of the optical lens module 12 and the image capturing path 5 of the image sensor module 11). In the present invention, the bulged cambered surface 131 of the base 15 and the concaved cambered surface 132 of the frame 14 are to provide relevant sliding contact between the two arc surfaces, such that the manufacturing Z-axis tilt between the image capturing axis 9 of the optical lens module 12 and the image capturing path 5 of the image sensor module 11 can be amended during the assembly stage. Further, an adhesive agent can be applied to anchor and fix the bulged cambered surface 131 and the concaved cambered surface 132, so that the influence of the uneven contact surface between the optical lens module 12 and the image sensor module 11 can be reduced to a minimum. Namely, the inevitable Z-axis tilt in between can be controlled in an allowable range.

In the following embodiments of the present invention, for most of the elements thereof are identical or at least similar to those of the aforesaid embodiment, details for those identical and similar elements are omitted. Further, the same names and numbers would be assigned to those identical elements, but a tailing letter would be assigned to any of those similar elements though still by the same names.

Figure 7:
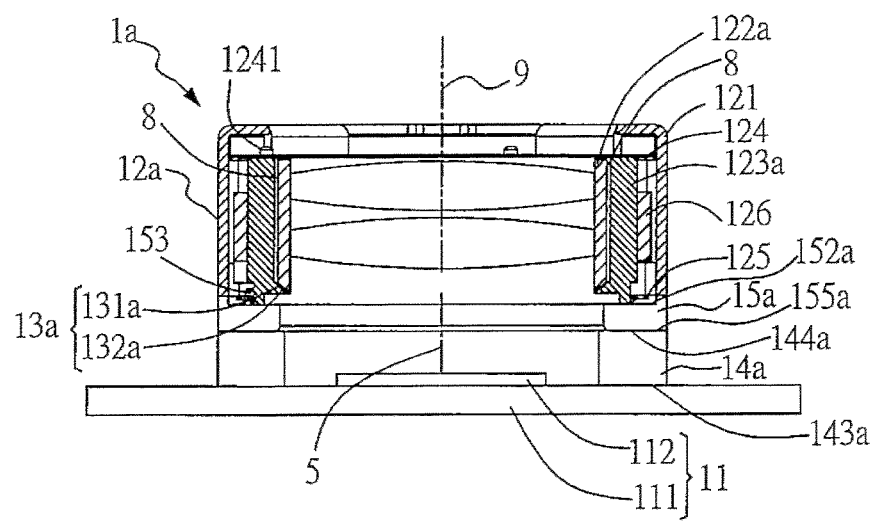
FIG. 7 is a cross sectional view of a second embodiment of the lens module having a positioning structure in accordance with the present invention.

Referring now to FIG. 7, a cross sectional view of a second embodiment of the lens module having a positioning structure in accordance with the present invention is shown. The major difference between this second embodiment and the aforesaid first embodiment is that, in the second embodiment, the bulged cambered surface 131*a* of the compensation module 13*a* is located under the lens set 122*a*, and the corresponding concaved cambered surface 132*a* to contact the bulged cambered surface 131*a* is located inside the lens set carrier 123*a*. in addition, the lateral side of the base 15*a* in correspondence with the engagement surface 152*a* is formed as a horizontal contact surface 155*a*, and the lateral side of the frame 14*a* in correspondence with the bottom surface 143*a* is formed as a horizontal load surface 144*a*. The lens set carrier 123*a* of the optical lens module 12*a* is fixed to the frame 14*a* through the base 15*a*. Namely, the tilt adjusting is based on the contact surface 155*a* of the base 15*a* and the load surface 144*a* of the frame 14*a* further to apply the sliding contact between the bulged cambered surface 131*a* under the lens set 122*a* and the concaved cambered surface 132*a* inside the lens set carrier 123*a* to compensate the manufacturing Z-axis tilt into an allowable range.

In particular, in this second embodiment, the lens set 122*a* is not screwed and fixed to the lens set carrier 123*a*. As shown, a spacing 8 is preset between the lens set 122*a* and the lens set carrier 123*a* so as to perform dynamic adjusting of the tilt angle by applying the sliding contact between the bulged cambered surface 131*a* under the lens set 122*a* and the concaved cambered surface 132*a* inside the lens set carrier 123*a*. Upon such an arrangement, the Z-axis tilt formed during the assembly stage between the optical lens module 12*a* and the image sensor module 11 can be adjusted and controlled into an allowable range. In addition, an adhesive agent can be applied to further fix the lens set 122*a* and the lens set carrier 123*a*, i.e. by fixing the bulged cambered surface 131*a* of the compensation module 13*a* onto the concaved cambered surface 132*a*: such that the influence of the Z-axis tilt upon the imaging can be reduced to a minimum so as to help the image sensor module 11 to perform better image capturing.

Figure 8:
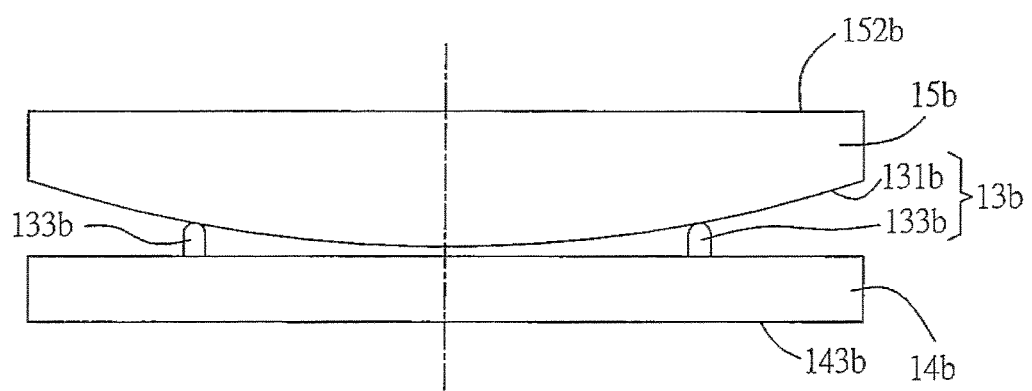
FIG. 8 shows a side view of a frame and a base for a third embodiment of the lens module having a positioning structure in accordance with the present invention.

Referring now to FIG. 8, a lateral view of a frame and a base for a third embodiment of the lens module having a positioning structure in accordance with the present invention is shown. By compared to the aforesaid first embodiment, this third embodiment is featured in that the lateral side of the frame 14*b* in correspondence with the bottom surface 143*b* includes a plurality of nodes 133*b*. The plurality of nodes 133*b* circularly arranged on the compensation module 13*b* is used to replace the concaved cambered surface 132 and the corresponding bulged cambered surface 131*b* on the base 15*b* of FIG. 2 or FIG. 3. In this third embodiment, the aforesaid sliding contact of the first embodiment for compensating the Z-axis tilt is achieved by the contact between tips of the nodes 133*b* and the bulged cambered surface 131*b*.

In summary, the lens module having a positioning structure 1 of the present invention, defined with a coordinate system having an X-axis, a Y-axis and a Z-axis perpendicular to each other, includes an image sensor module 11, an optical lens module 12 and a compensation module 13. The image sensor module 11 located on an X-Y plane has an image capturing path 5 extending along the Z-axis. The optical lens module 12 has an image capturing axis 9 extending along the Z-axis and is located in correspondence with the image sensor module 11. The compensation module 13 located between the image sensor module 11 and the optical lens module 12 for compensating the Z-axial tilt angle of the optical lens module 12 further includes a sliding contact pair consisted of a bulged cambered surface 131 and a concaved cambered surface 132.

The bulged cambered surface 131 and the image capturing axis 9 of the optical lens module 12 is synchronously moved. By providing the sliding contact between the bulged cambered surface 131 and the concaved cambered surface 132, the compensation module 13 can correct the manufacturing Z-axis tilt between the image capturing axis 9 of the optical lens module 12 and the image capturing path 5 of the image sensor module 11 to an allowable range.

While the present invention has been particularly shown and described with reference to a preferred embodiment, it will be understood by those skilled in the art that various changes in form and detail may be without departing from the spirit and scope of the present invention.

What is claimed is:

1. A lens module having a positioning structure, defined with a coordinate system having an X-axis, a Y-axis and a Z-axis perpendicular to each other, comprising:
   an image sensor module, located on a X-Y plane, further having an image capturing path extending along the Z-axis;
   an optical lens module, having an image capturing axis extending along the Z-axis, located corresponding to the image sensor module; and
   a compensation module, located between the image sensor module and the optical lens module for compensating a tilt angle of the optical lens module from the Z-axis, further including a bulged cambered surface and a concaved cambered surface corresponding to the bulged cambered surface;
   wherein one of the bulged cambered surface and the concaved cambered surface is synchronously movable with the image capturing axis of the optical lens module;
   wherein the tilt angle between the image capturing axis of the optical lens module and the image capturing path of the image sensor module is adjusted by sliding the bulged cambered surface with respect to the concaved cambered surface.

2. The lens module having a positioning structure of claim 1, wherein the image sensor module located under the compensation module further includes a circuit board and an image sensor, wherein the image sensor located on the circuit board is to capture foreign optical images via the optical lens module.

3. The lens module having a positioning structure of claim 2, further including:
   a frame, fixed to the circuit board at a position above the image sensor; and
   a base, fixed under the optical lens module in a manner of contacting the frame;
   wherein the bulged cambered surface of the compensation module is located on the base, the concaved cambered surface is located on the frame, and the concaved cambered surface is to contact the bulged cambered surface.

4. The lens module having a positioning structure of claim 2, wherein the image sensor is one of a CCD element and a CMOS element, and the optical lens module is one of a focusing lens module and a zooming lens module.

5. The lens module having a positioning structure of claim 1, wherein the optical lens module further includes a casing, a lens set, a lens set carrier, an upper spring plate, a lower spring plate, a coil assembly and at least one magnetic member, the at least one magnetic member and the corresponding coil assembly being located respectively at the casing and the lens set carrier, the lens set being located inside the lens set carrier, the lens set carrier being elastically clamped between the upper spring plate and the lower spring plate in an accommodation room of the casing;
   wherein, by energizing the coil assembly, a magnetic force is induced to the magnetic member so as to drive the lens set carrier to displace along the Z-axis in the accommodation room.

6. The lens module having a positioning structure of claim 5, wherein each of the upper spring plate and the lower spring plate is made of a metal material and formed as an elastic hollow thin plate structure, and is manufactured by a punch process.

7. The lens module having a positioning structure of claim 5, wherein the bulged cambered surface of the compensation module is located under the lens set, the concaved cambered surface to contact the bulged cambered surface is located inside the lens set carrier, and a spacing exists between the lens set and the lens set carrier.

8. The lens module having a positioning structure of claim 5, further including at least one elastic position member having a hook end, the hook end penetrating a corresponding groove of the frame, passing a corresponding penetration hole of the base, and fixing by hooking the lower spring plate onto the base.

9. The lens module having a positioning structure of claim 8, wherein the elastic position member is made of a metal, and the elastic position member further has a conductive end opposing to the hook end to establish an electric connection with the circuit board, such that, while a current of the circuit board is forwarded to energize the coil assembly via the lower spring plate, a magnetic field is induced to exert a corresponding magnetic force on the magnetic member.

10. The lens module having a positioning structure of claim 1, wherein the concaved cambered surface is formed by tips of a plurality of nodes.

* * * * *